(12) United States Patent
Denton et al.

(10) Patent No.: US 10,427,099 B2
(45) Date of Patent: *Oct. 1, 2019

(54) DUAL AUGER MIXING SYSTEM

(71) Applicant: Tenneco Automotive Operating Company Inc., Lake Forest, IL (US)

(72) Inventors: Jeffrey W. Denton, Jackson, MI (US); Eric A. Hein, Neustadt an der Weinstrasse (DE); Attila Kovacs, Karlsruhe (DE); Kevin R. Reeder, Carson City, MI (US); Jonar Mendoza, Ann Arbor, MI (US); Gary R. Moore, Tecumseh, MI (US); Manoj K. Sampath, Ann Arbor, MI (US); John R. Hardin, Milford, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,293

(22) Filed: Sep. 26, 2018

(65) Prior Publication Data

US 2019/0022583 A1  Jan. 24, 2019

Related U.S. Application Data

(63) Continuation of application No. 15/050,504, filed on Feb. 23, 2016, now Pat. No. 10,086,333.

(Continued)

(51) Int. Cl.
*B01D 53/94* (2006.01)
*B01F 5/04* (2006.01)
(Continued)

(52) U.S. Cl.
CPC ..... *B01D 53/9431* (2013.01); *B01D 53/9409* (2013.01); *B01F 3/04049* (2013.01);
(Continued)

(58) Field of Classification Search
CPC ........ B01D 2251/2067; B01D 53/9409; B01D 53/9431; B01F 2005/0637; B01F 3/04049;
(Continued)

(56) References Cited

U.S. PATENT DOCUMENTS

| 4,208,136 A | 6/1980 | King |
| 4,985,058 A | 1/1991 | Prinsloo et al. |

(Continued)

FOREIGN PATENT DOCUMENTS

| DE | 202006017848 U1 | 3/2007 |
| DE | 102012221342 A1 | 5/2014 |

(Continued)

*Primary Examiner* — Thai Ba Trieu
*Assistant Examiner* — Diem T Tran
(74) *Attorney, Agent, or Firm* — Harness, Dickey & Pierce, P.L.C.

(57) ABSTRACT

A mixing system for an exhaust system includes a first mixing device having a plurality of first auger blades and an inlet having a first cross-sectional area. A second mixing device is separate and downstream from the first mixing device and includes a second auger blade. The second mixing device includes an inlet having a second cross-sectional area greater than the first cross-sectional area. A flow path longitudinal centerline of the first mixing device extends at an angle to a flow path longitudinal centerline of the second mixing device. A flow path longitudinal centerline of the first mixing device intersects the second auger blade. The first mixing device is disposed within a first portion of an exhaust pipe and the second mixing device is disposed in a second portion of the exhaust pipe. The second portion has a larger cross-sectional area than the first portion.

10 Claims, 8 Drawing Sheets

Related U.S. Application Data

(60) Provisional application No. 62/119,923, filed on Feb. 24, 2015.

(51) Int. Cl.
    *B01F 5/06*           (2006.01)
    *B01F 3/04*           (2006.01)
    *F01N 3/20*           (2006.01)

(52) U.S. Cl.
CPC .......... *B01F 5/0473* (2013.01); *B01F 5/0615* (2013.01); *B01F 5/0653* (2013.01); *B01F 5/0688* (2013.01); *B01D 2251/2067* (2013.01); *B01F 2005/0637* (2013.01); *F01N 3/206* (2013.01); *F01N 3/2066* (2013.01); *F01N 2240/20* (2013.01); *F01N 2610/02* (2013.01)

(58) Field of Classification Search
CPC .... B01F 5/0473; B01F 5/0615; B01F 5/0653; B01F 5/0688; F01N 2240/20; F01N 2610/02; F01N 3/206; F01N 3/2066
See application file for complete search history.

(56) References Cited

U.S. PATENT DOCUMENTS

| | | |
|---|---|---|
| 5,178,461 A | 1/1993 | Taniguchi |
| 6,343,673 B1 | 2/2002 | Chang |
| 6,401,455 B1 | 6/2002 | Mathes et al. |
| 6,442,933 B2 | 9/2002 | Rusch |
| 6,553,755 B2 | 4/2003 | Hofmann et al. |
| 6,740,198 B2 | 5/2004 | Ahola et al. |
| 7,063,817 B2 | 6/2006 | Sigling |
| 7,073,626 B2 | 7/2006 | Weinhold et al. |
| 7,117,973 B2 | 10/2006 | Graefenstein |
| 7,490,467 B2 | 2/2009 | Cummings |
| 7,510,172 B2 | 3/2009 | Kojima |
| 7,552,723 B1 | 6/2009 | Ugalde |
| 7,581,387 B2 | 9/2009 | Bui et al. |
| 7,614,211 B2 | 11/2009 | Chapin et al. |
| 7,712,305 B2 | 5/2010 | Kapsos et al. |
| 7,814,745 B2 | 10/2010 | Levin et al. |
| 7,896,645 B2 | 3/2011 | Loving |
| 8,141,353 B2 | 3/2012 | Zheng et al. |
| 8,272,777 B2 | 9/2012 | Kohrs et al. |
| 8,312,962 B2 | 11/2012 | Melcher et al. |
| 8,359,832 B2 | 1/2013 | Yi et al. |
| 8,371,114 B2 | 2/2013 | Hayashi et al. |
| 8,375,709 B2 | 2/2013 | Salanta et al. |
| 8,397,495 B2 | 3/2013 | Salanta et al. |
| 8,484,948 B2 | 7/2013 | Kozal |
| 8,602,159 B2 | 12/2013 | Harris et al. |
| 8,627,921 B2 | 1/2014 | Mead |
| 8,661,792 B2 | 3/2014 | Greber et al. |
| 8,800,276 B2 | 8/2014 | Levin et al. |
| 8,915,064 B2 | 12/2014 | Blaisdell et al. |
| 2006/0150614 A1 | 7/2006 | Cummings |
| 2007/0041266 A1 | 2/2007 | Huymann |
| 2007/0205523 A1* | 9/2007 | Kojima ................. B01D 53/18 261/79.2 |
| 2008/0295497 A1 | 12/2008 | Kornherr et al. |
| 2009/0000287 A1 | 1/2009 | Blaisdell et al. |
| 2009/0019843 A1* | 1/2009 | Levin .................. B01F 3/04049 60/303 |
| 2010/0263359 A1 | 10/2010 | Haverkamp et al. |
| 2011/0067381 A1 | 3/2011 | Zimmerman et al. |
| 2012/0204541 A1 | 8/2012 | Li et al. |
| 2013/0021868 A1 | 1/2013 | Doolin et al. |
| 2013/0239546 A1* | 9/2013 | Levin .................... B01F 5/0268 60/274 |
| 2013/0333363 A1 | 12/2013 | Joshi et al. |
| 2014/0033686 A1* | 2/2014 | Fischer ............... B01F 3/04049 60/286 |
| 2014/0044603 A1 | 2/2014 | Greber |
| 2014/0318112 A1 | 10/2014 | Solbrig et al. |
| 2014/0332312 A1 | 11/2014 | Harris et al. |
| 2014/0345257 A1 | 11/2014 | Levin et al. |

FOREIGN PATENT DOCUMENTS

| | | |
|---|---|---|
| EP | 1109993 B1 | 6/2001 |
| EP | 1371824 A1 | 12/2003 |
| EP | 1712751 A2 | 10/2006 |
| EP | 02512642 B1 | 10/2012 |
| JP | 2006205077 A | 8/2006 |
| JP | 2011206751 A | 10/2011 |
| WO | 2008046681 A1 | 4/2008 |
| WO | 2011053013 A2 | 5/2011 |
| WO | 2014051605 A1 | 4/2014 |

\* cited by examiner

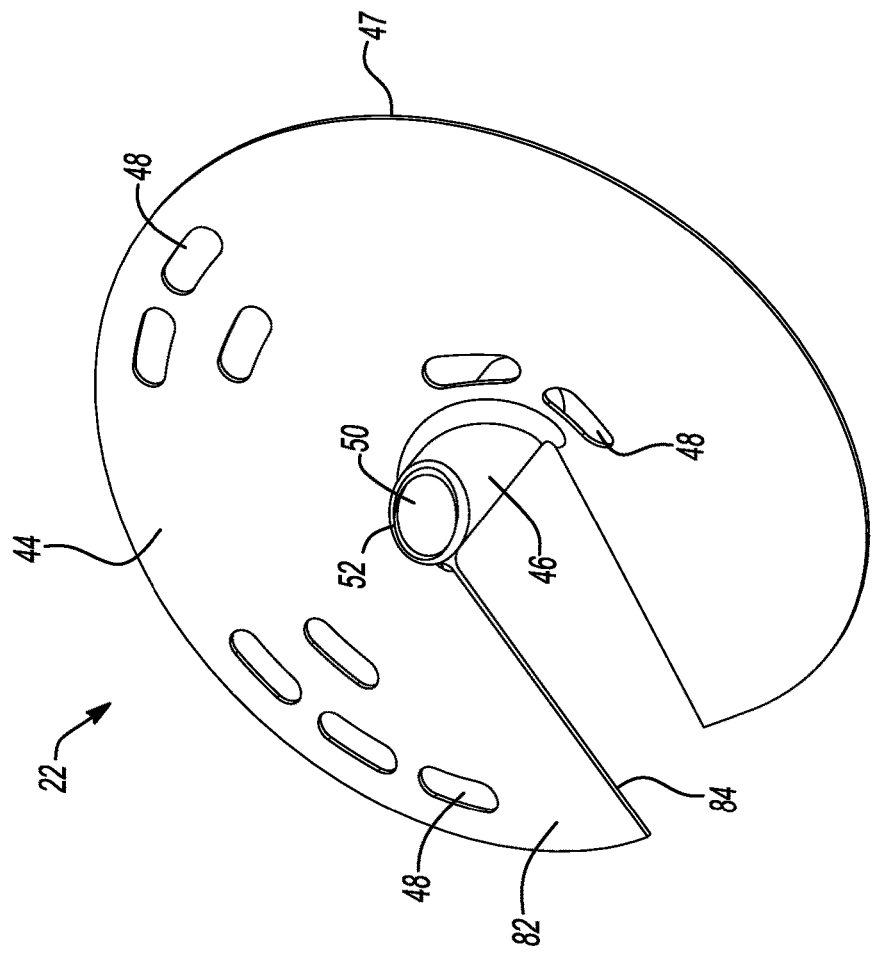
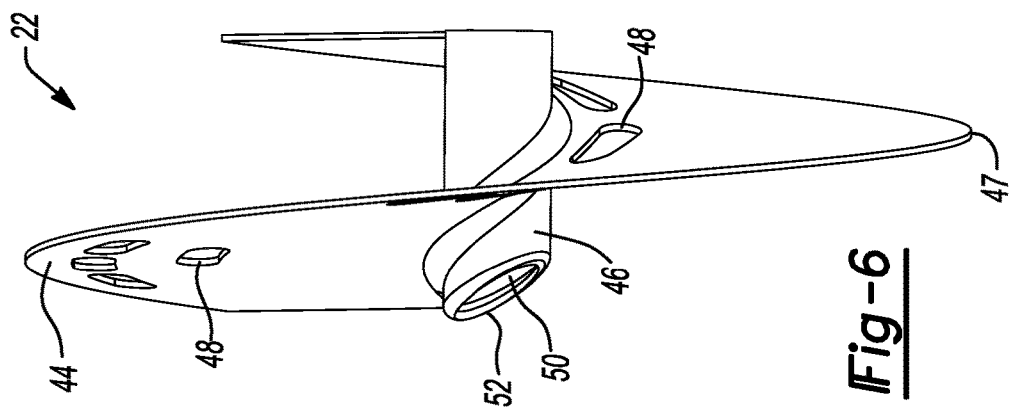

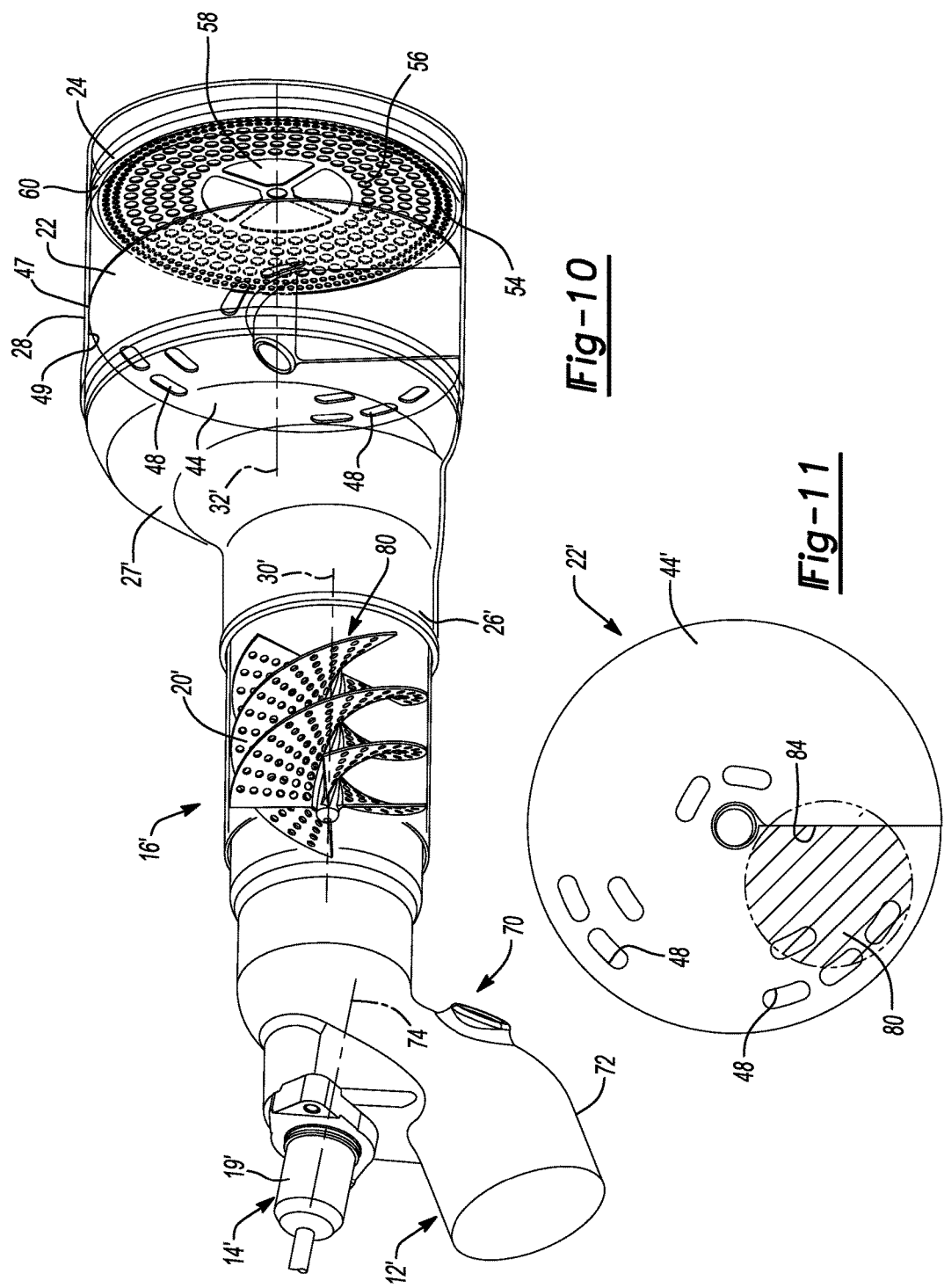

DUAL AUGER MIXING SYSTEM

CROSS-REFERENCE TO RELATED APPLICATIONS

This application is a continuation of U.S. patent application Ser. No. 15/050,504, filed on Feb. 23, 2016, which claims the benefit of U.S. Provisional Application No. 62/119,923, filed on Feb. 24, 2015. The entire disclosures of the above applications are incorporated herein by reference.

FIELD

The present disclosure relates to a dual auger mixing system for an exhaust aftertreatment system.

BACKGROUND

This section provides background information related to the present disclosure and is not necessarily prior art.

Selective catalytic reduction technology has been used in conjunction with reducing nitrogen oxides present in the exhaust of combustion engines. Many vehicles utilizing combustion engines are equipped with exhaust aftertreatment devices for reducing nitrogen oxide emissions. Some of these systems include a reductant delivery system for transmitting the reductant (e.g., urea) from a tank to the exhaust stream. A mixer may be provided for mixing the injected reductant with the exhaust gas before the reductant reaches a catalyst with which the reductant reacts. While these systems may have performed well in the past, it may be desirable to provide an improved mixing system that is able to fit in a limited packaging space and can more efficiently decompose and atomize the reductant and mix the reductant with the exhaust stream.

SUMMARY

This section provides a general summary of the disclosure, and is not a comprehensive disclosure of its full scope or all of its features.

In one form, the present disclosure provides a mixing system for an exhaust aftertreatment system. The mixing system may include first and second mixing devices. The first mixing device may include a plurality of first auger blades attached to a central shaft and defining a plurality of flow paths through the first mixing device. Each of the first auger blades may be axially aligned with each other and angularly spaced apart from each other. The second mixing device may be separate and distinct from the first mixing device and may be disposed downstream of the first mixing device. The second mixing device may include a second auger blade. The plurality of flow paths created by the first mixing device may recombine into a single flow path between the first and second mixing devices.

In another form, the present disclosure provides a mixing system for an exhaust aftertreatment system. The mixing system is disposed within an exhaust pipe and may include first and second mixing devices and a baffle plate. The first mixing device may include a plurality of first auger blades defining a plurality of flow paths through the first mixing device. The second mixing device may be separate and distinct from the first mixing device and may be disposed downstream of the first mixing device. The second mixing device may include a second auger blade. The plurality of flow paths created by the first mixing device may recombine into a single flow path between the first and second mixing devices. The baffle plate may be separate and distinct from the second mixing device and may be disposed downstream of the second mixing device.

In another form, the present disclosure provides a mixing system for an exhaust aftertreatment system including a first mixing device having a plurality of first auger blades and an inlet having a first cross-sectional area. A second mixing device is separate and downstream from the first mixing device and includes a second auger blade. The second mixing device includes an inlet having a second cross-sectional area greater than the first cross-sectional area. A plurality of flow paths created by the first mixing device are recombined into a single flow path between the first and second mixing devices. A longitudinal center line of the first mixing device is offset from a longitudinal center line of the second mixing device.

In some configurations, the baffle plate includes a plurality of first apertures, a plurality of second apertures and a plurality of third apertures. The first apertures may be disposed proximate a periphery of the baffle plate and are each smaller than the second and third apertures. The second apertures may be disposed radially between the first apertures and the third apertures and are each smaller than the third apertures. The third apertures may be arranged proximate a center of the baffle plate.

In some configurations, the first mixing device includes a tapered central shaft about which the first auger blades extend.

In some configurations, the second mixing device includes a central shaft about which the second auger blade extends. The central shaft may include an aperture extending axially therethrough.

In some configurations, each of the first auger blades includes a plurality of apertures.

In some configurations, each of the first auger blades extends 180 degrees around a central shaft.

In some configurations, the first auger blades extend in the same rotational direction around the central shaft.

In some configurations, the second auger blade include a plurality of apertures.

In some configurations, the second auger blade extends 360 degrees around a central shaft.

In some configurations, the second auger blade extends between 180 degrees and 720 degrees around a second central shaft.

In some configurations, the second mixing device includes only a single auger blade.

In some configurations, the first mixing device is disposed within a first portion of the exhaust pipe, and the second mixing device and the baffle plate are disposed in a second portion of the exhaust pipe. The second portion may have a larger diameter than the first portion.

In some configurations, a longitudinal centerline of the first portion is offset from a longitudinal centerline of the second portion.

In another form, the present disclosure provides an exhaust aftertreatment system including the mixing system, a reductant injector disposed upstream of the first mixing device, and a catalyst disposed downstream of the baffle plate.

A mixing system for an exhaust system includes a first mixing device having a plurality of first auger blades and an inlet having a first cross-sectional area. A second mixing device is separate and downstream from the first mixing device and includes a second auger blade. The second mixing device includes an inlet having a second cross-sectional area greater than the first cross-sectional area. A flow path longitudinal centerline of the first mixing device extends at an angle to a flow path longitudinal centerline of the second mixing device. A flow path longitudinal centerline of the first mixing device intersects the second auger blade. The first mixing device is disposed within a first portion of an exhaust pipe and the second mixing device is disposed in a second portion of the exhaust pipe. The second portion has a larger cross-sectional area than the first portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a side view of a second mixing device of the mixing system;

FIG. 7 is a perspective view of the second mixing device;

FIG. 10 is a perspective view of a portion of an alternate mixing system; and

FIG. 11 is a schematic of a portion of an alternate mixing system.

Corresponding reference numerals indicate corresponding parts throughout the several views of the drawings.

DETAILED DESCRIPTION

Figure 1:
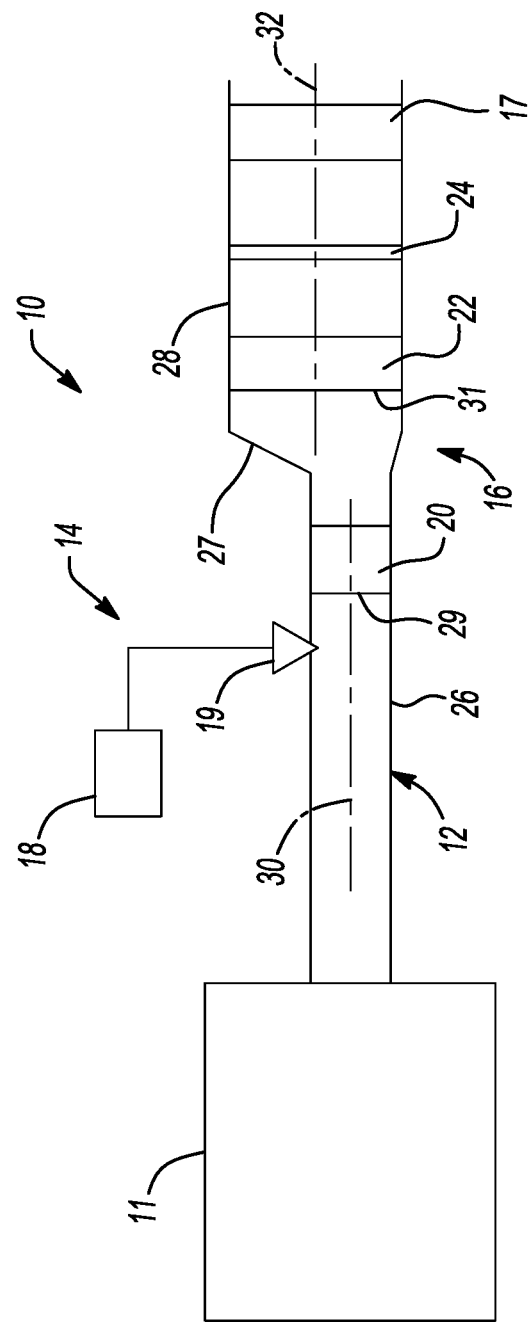
FIG. 1 is a schematic representation of an exhaust aftertreatment system having a mixing system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust aftertreatment system 10 is provided that may include an exhaust pipe 12, a reductant delivery system 14, a mixing system 16 and an aftertreatment device 17 disposed downstream of the mixing system 16. The exhaust pipe 12 may receive exhaust gas discharged from a combustion engine 11. Exhaust gas may flow through the exhaust pipe 12, the mixing system 16 and the aftertreatment device 17 before being discharged to the ambient environment. The aftertreatment device 17 can include a selective catalytic reduction (SCR) catalyst or an SCR coated diesel particulate filter (DPF), for example. The reductant delivery system 14 can include a reductant tank 18 and an injector 19 (shown schematically in FIGS. 1 and 2) configured to inject a reductant (e.g., urea) into the exhaust pipe 12 upstream of the mixing system 16. The mixing system 16 performs decomposition and atomization within the exhaust stream within a reduced axial pathway and increases particle residency in the exhaust stream by inducing radial flow components in the exhaust stream that oppose the natural axial exhaust flow path through the exhaust pipe 12. The mixing system 16 creates a series of axial flows, radial flows, micro flows, macro flows and combinations thereof to transmute system energy to increase decomposition routines.

Figure 2:
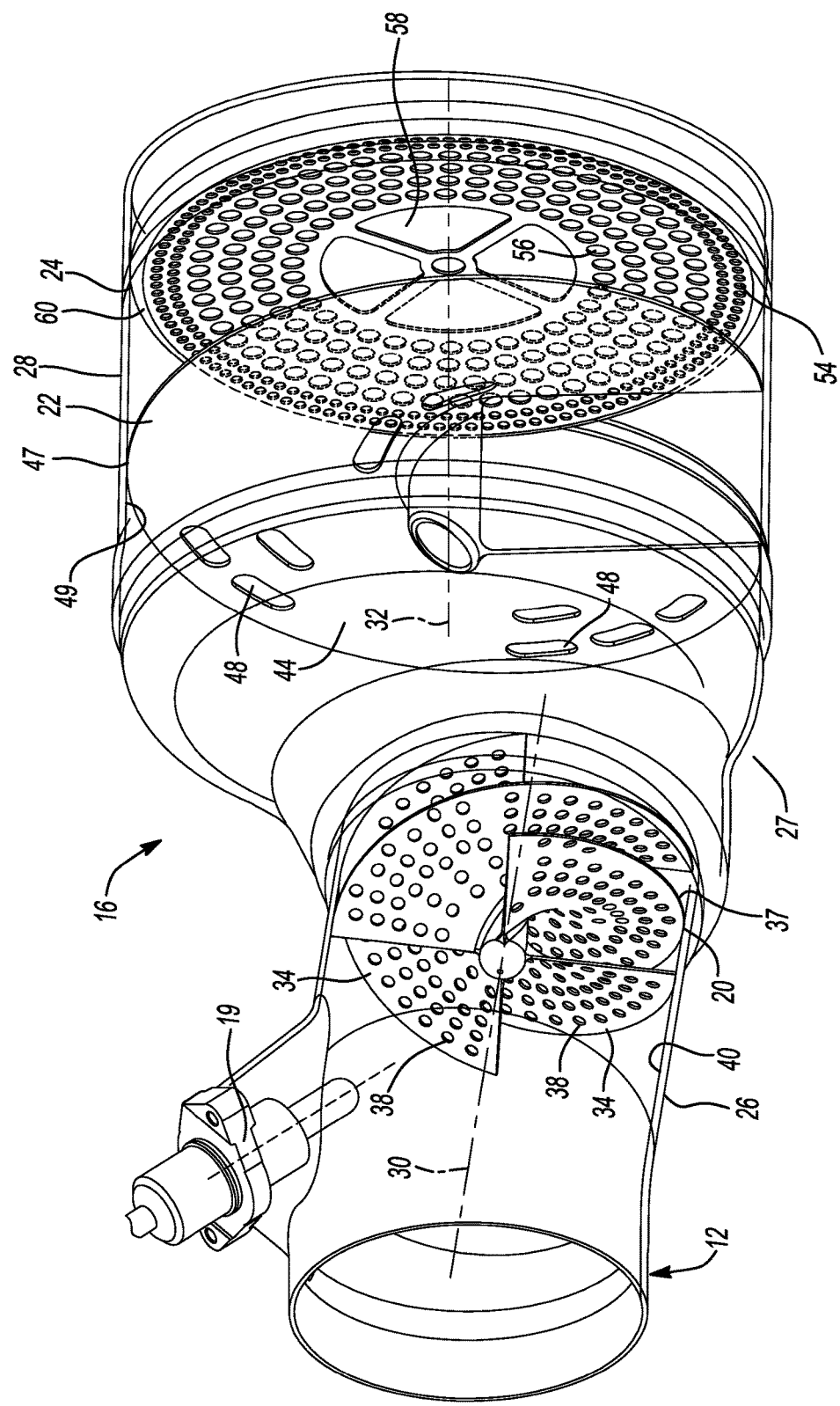
FIG. 2 is a perspective view of a portion of an exhaust pipe with the mixing system of FIG. 1 disposed therein.

As shown in FIGS. 1 and 2, the mixing system 16 may include a first mixing device 20, a second mixing device 22 and a baffle plate 24. The first and second mixing devices 20, 22 and the baffle plate 24 may be spaced apart from each other and disposed downstream of the injector 19. The first mixing device 20 may be disposed in a first portion 26 of the exhaust pipe 12. The second mixing device 22 and the baffle plate 24 may be disposed in a second portion 28 of the exhaust pipe 12 disposed downstream of the first portion 26. In some configurations, the second portion 28 may be a barrel containing the aftertreatment device 17 (e.g., an SCR catalyst). The first portion 26 may have a smaller diameter than the second portion 28. More generally, first mixing device 20 may include an inlet 29 having a smaller cross-sectional area than an inlet 31 of the second mixing device 22. First mixing device 20 includes a longitudinal centerline 30 that is offset from a longitudinal centerline 32 of the second mixing device 22. The offset between the centerlines 30, 32 advantageously increases the travel length of the reductant particles. Centerline 30 may extend parallel to centerline 32 or at an angle thereto, as depicted in FIG. 2. A transition cone 27 may fluidly connect the first and second portions 26, 28. The aftertreatment device 17 may be disposed in the second portion 28 downstream of the second mixing device 22 and the baffle plate 24. It will be appreciated that one or more portions of the exhaust pipe 12, such as one or both of the first and second portions 26, 28, as well as first and second mixing devices 20, 22, could include a circular, oval or polygonal cross-sectional shape or any other cross-sectional shape.

Figure 3:
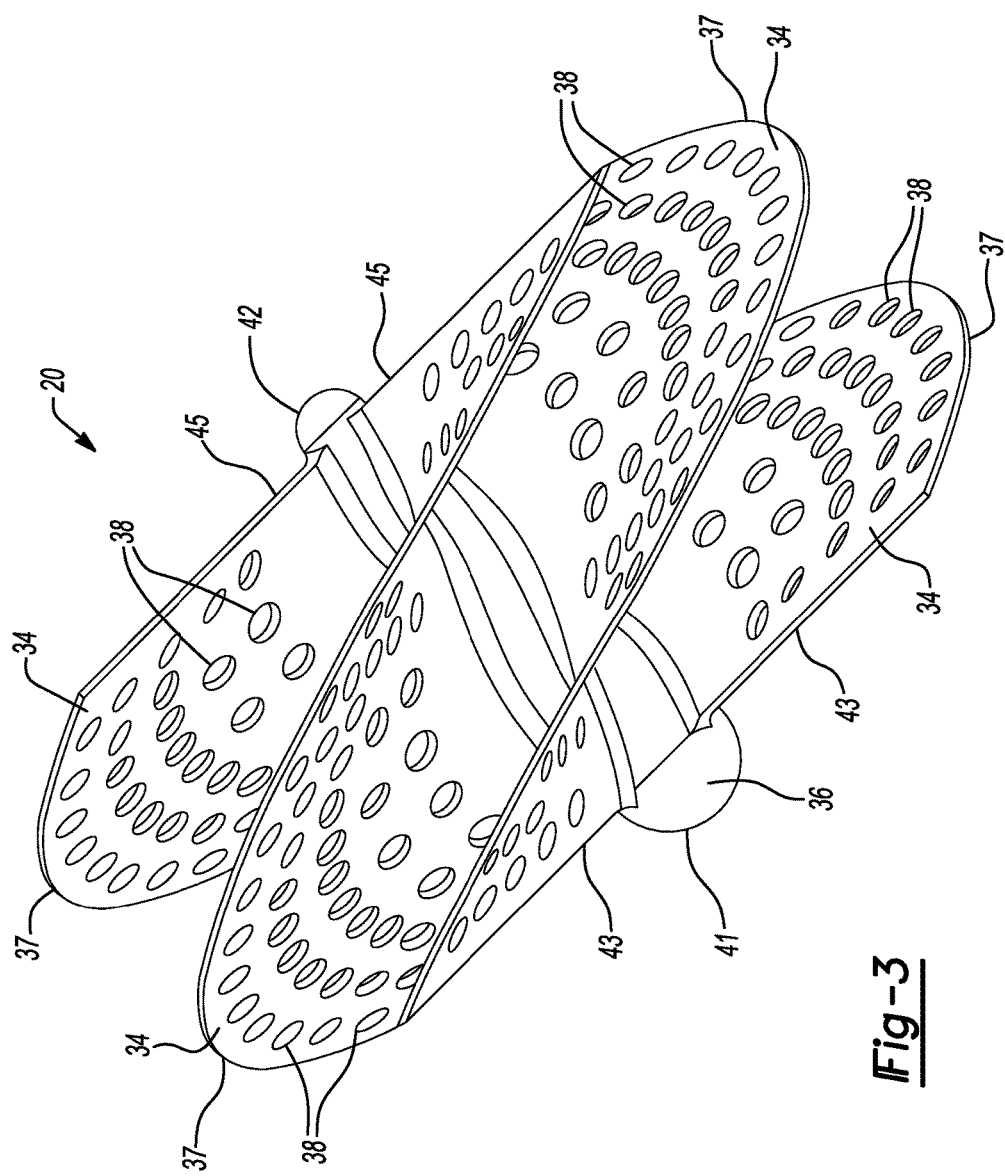
FIG. 3 is a perspective view of a first mixing device of the mixing system.
Figure 4:
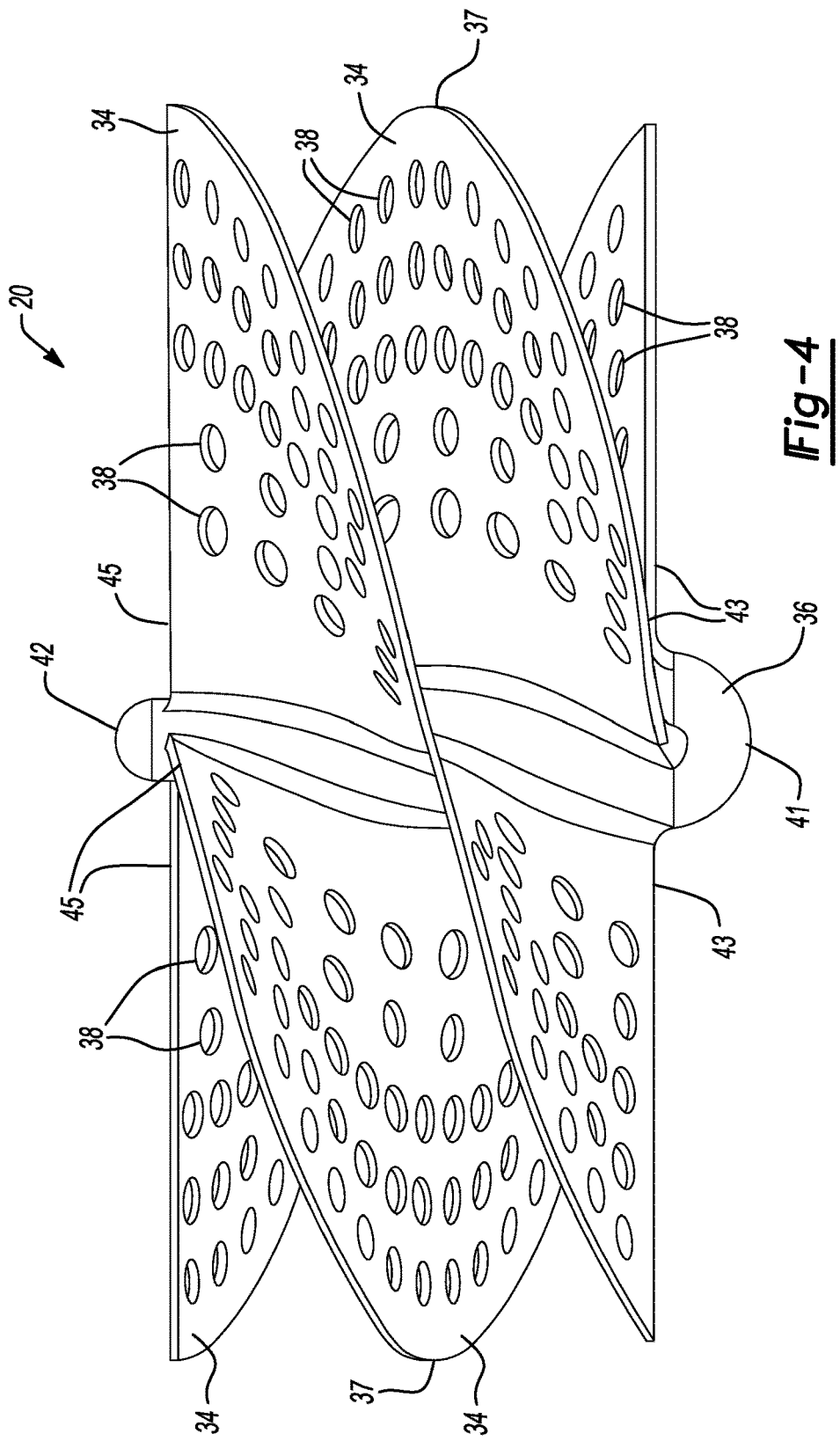
FIG. 4 is a side view of the first mixing device.
Figure 5:
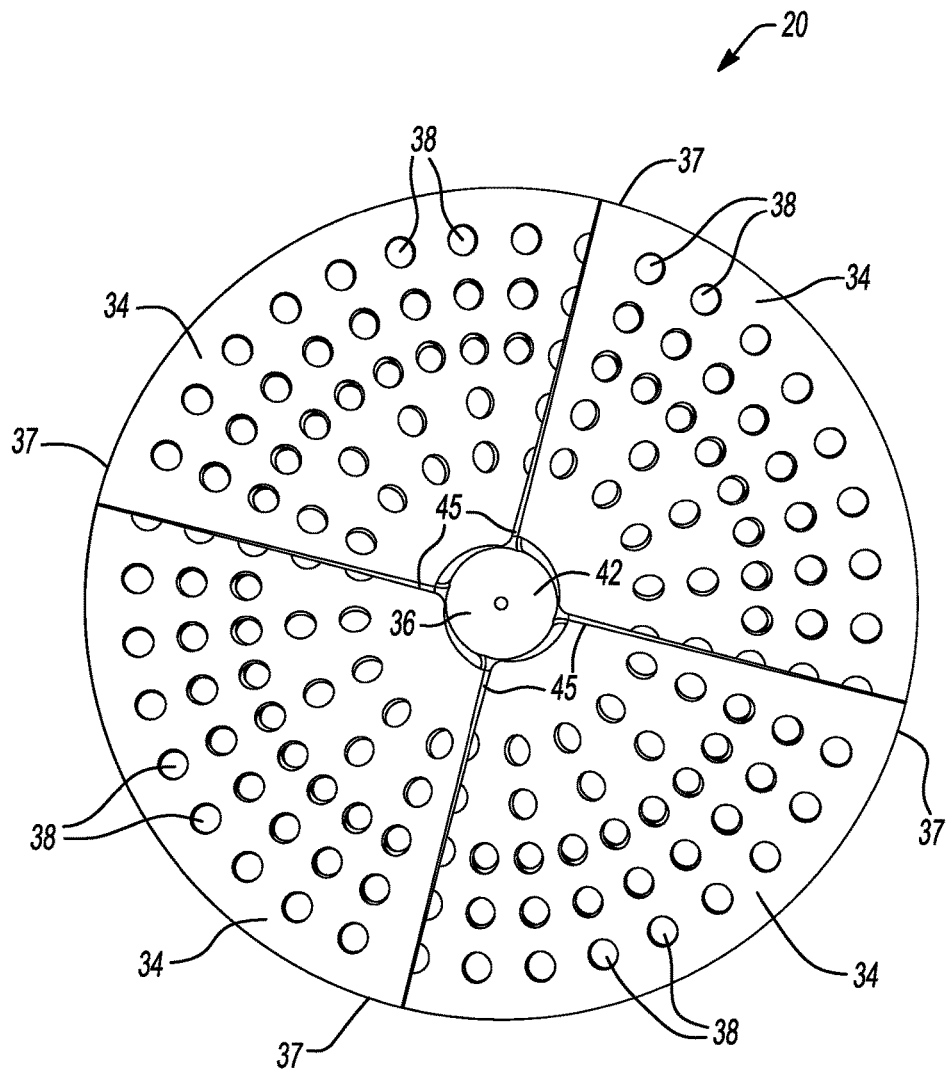
FIG. 5 is an end view of the first mixing device.

As shown in FIGS. 3-5, the first mixing device 20 may be an auger having a plurality of generally helical blades 34 supported on a central shaft 36. Radially outer edges 37 of the blades 34 may fixedly engage an inner diametrical surface 40 (FIG. 2) of the first portion 26 of the exhaust pipe 12. The blades 34 may define a plurality of generally helical flow paths through the first mixing device 20. In the configuration shown in the figures, the first mixing device 20 includes four blades 34 that extend 180 degrees around the central shaft 36 and define four different helical flow paths. In the configuration shown in the figures, all of the blades 34 extend in the same rotational direction around the central shaft 36. Each of the blades 34 may include a plurality of apertures 38 that allow some fluid communication between the flow paths. Reductant injected by the injector 19 is atomized as it flows through the first mixing device 20. Further, the blades 34 of the first mixing device 20 induce turbulence in the flow of exhaust gas and reductant, which facilitates mixing of the reductant and the exhaust gas. The helical shapes of the flow paths through the first mixing device 20 increase the amount of time that the reductant is resident in the exhaust gas, thereby increasing evaporation of the reductant without increasing an axial distance that the reductant travels. The apertures 38 in the blades 34 reduce backpressure created by the first mixing device 20 and decrease the surface area of the blades 34, thereby reducing the production of reductant deposits on the blades 34.

The central shaft 36 may be tapered such that the diameter of the central shaft 36 decreases as the shaft 36 extends axially from an upstream end 41 of the shaft 36 to a downstream end 42 of the shaft 36. This tapered shape of the shaft 36 reduces flow separation as the exhaust gas and reductant flow through the first mixing device 20. Upstream ends 43 of all of the blades 34 may all be disposed at the same axial position relative to the upstream end 41 of the shaft 36, and downstream ends 45 of all of the blades 34 may all be disposed at the same axial position relative to the downstream end 42 of the shaft 36 (i.e., all of the blades 34 may have the same axial length and may be located at the same axial position along the longitudinal axis of the shaft 36).

Figure 8:
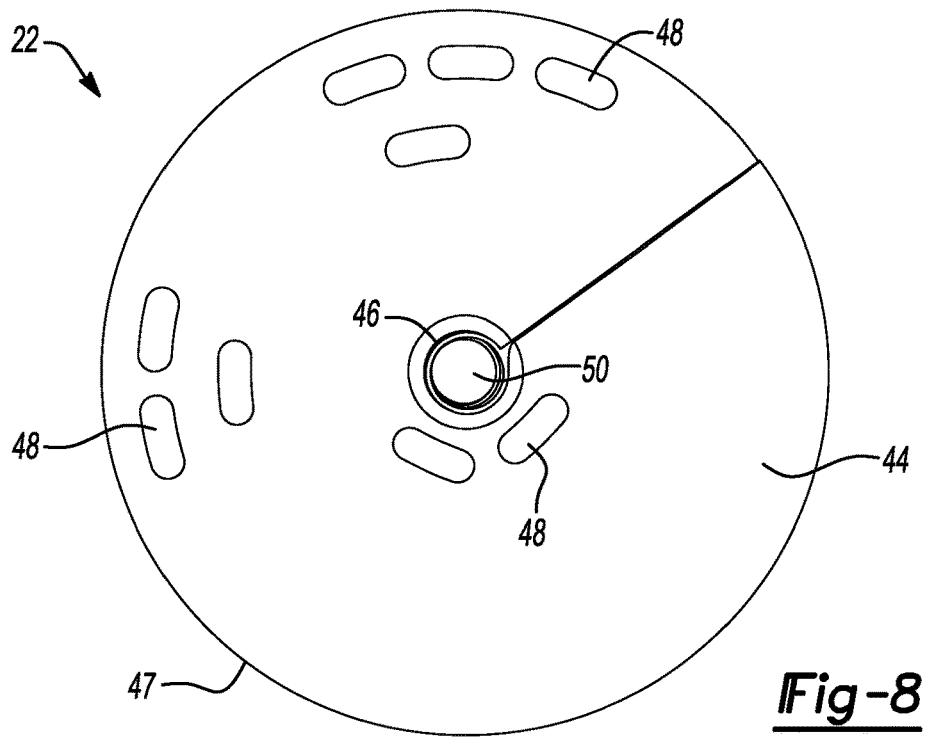
FIG. 8 is an end view of the second mixing device.

As shown in FIGS. 6-8, the second mixing device 22 may be an auger having one or more generally helical blades 44 attached to and extending around a central shaft 46. The second mixing device 22 may include a single blade 44 that may extend about 360 degrees (or between about 180 and 720 degrees, for example) around the shaft 46. A radially outer edge 47 of the blade 44 may fixedly engage an inner diametrical surface 49 (FIG. 2) of the second portion 28 of the exhaust pipe 12. The helical shape of the flow path defined by the blade 44 increases the amount of time that the reductant is resident in the exhaust gas, thereby increasing evaporation of the reductant without increasing an axial distance that the reductant travels. The pitch angle of the blade 44 of the second mixing device 22 can be different than the pitch angles of the blades 34 of the first mixing device 20. In some configurations, the pitch angles of the blades 34 may be greater than the pitch angle of the blade 44. In other configurations, the pitch angle of the blade 44 may be greater than the pitch angles of the blades 34. The orientation, right hand or left hand, direction of the helical shape of blades 34 may be the same or different than the orientation of the helically-shaped blade 44. As such, exhaust gas may be urged to rotate in a first direction by blades 34 and either continue to be urged in the same direction of rotation by blade 44 or in the opposite direction of rotation by a version of blade 44 having the opposite orientation of the helical shape.

It should also be appreciated that the scope of the present disclosure includes possibly swapping the positions of first mixing device 20 and second mixing device 22 such that second mixing device 22 may be positioned upstream of first mixing device 20. The first mixing device 20 includes an inlet with a smaller cross-sectional area than the inlet of second mixing device 22. The transition between one device to the next may be accomplished through gradual means of a tapered expansion or reduction. In the alternate arrangement described, the upstream mixing device defines a single flow path while the downstream mixing device includes more than one gas flow path.

Returning to FIGS. 6-8, blade 44 can include a plurality of apertures 48 that reduce backpressure created by the second mixing device 22 and decrease the surface area of the blade 44, thereby reducing the production of reductant deposits on the blade 44. In some configurations, the blade 44 can include flaps, dimples, ridges and/or other surface features instead of or in addition to the apertures 48 to direct flow through the apertures 48 and/or influence macroscopic flow through the second mixing device 22.

The shaft 46 may include an aperture 50 extending axially therethrough. The aperture 50 reduces backpressure created by the second mixing device 22 and may eliminate a flow velocity "dead zone" at the center of the aftertreatment device 17. An upstream end 52 of the shaft 46 can be angled relative to a longitudinal axis of the shaft 46 to reduce stagnation at the leading edge of the aperture 50. In some configurations, the angle of the upstream end 52 can be approximately equal to the pitch angle of the blade 44. In some instances the shaft 46 and/or the aperture 50 may be tapered such that a cross-sectional area of the aperture 50 decreases as the shaft 46 extends from an upstream position to a downstream position in similar fashion to central shaft 36.

Figure 9:
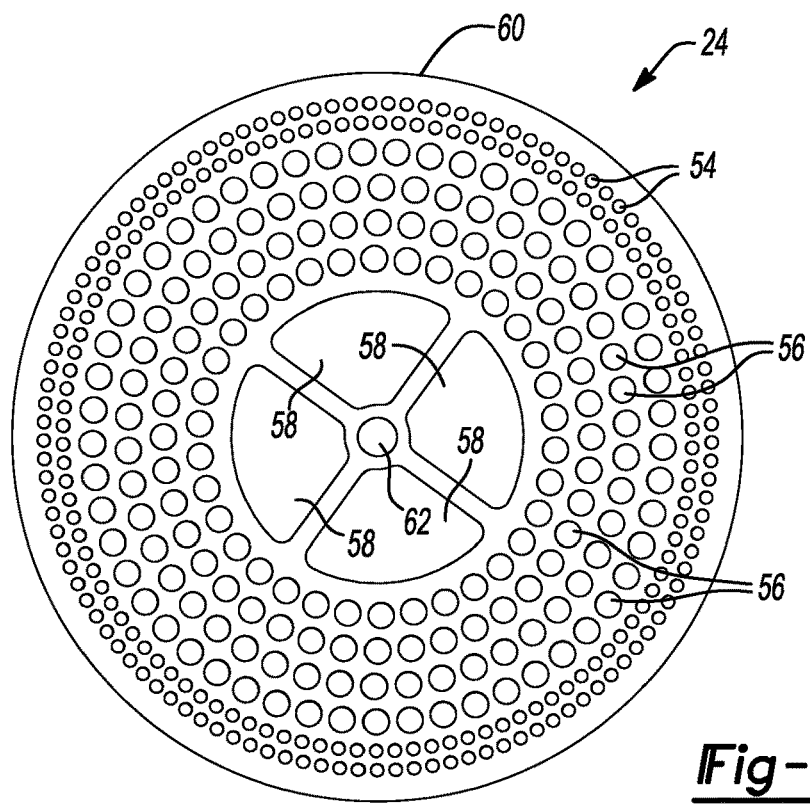
FIG. 9 is an end view of a baffle plate of the mixing system.

As shown in FIG. 9, the baffle plate 24 may include a plurality of first apertures 54, a plurality of second apertures 56 and a plurality of third apertures 58. A radially outer periphery 60 of the baffle plate 24 may fixedly engage the inner diametrical surface 49 (FIG. 2) of the second portion 28 of the exhaust pipe 12. The first apertures 54 may be disposed proximate a periphery 60 of the baffle plate 24 and are each smaller than the second and third apertures 56, 58. The second apertures 56 may be disposed radially between the first apertures 54 and the third apertures 58. The second apertures 56 may be smaller than the third apertures 58. The third apertures 58 may be arranged proximate a center of the baffle plate 24. Each of the third apertures 58 may be substantially larger than each of the first and second apertures 54, 56. In some configurations, a fourth aperture 62 may be centered on the longitudinal axis of the baffle plate 24. The configuration of the apertures 54, 56, 58, 62 described above and shown in the figures can redistribute the flow toward a laminar condition prior to the flow entering the aftertreatment device 17. Furthermore, the configuration of the apertures 54, 56, 58, 62 can separate high-velocity flow near the wall of the second portion 28 of the exhaust pipe 12. In some configurations, the baffle plate 24 can restrict the flow through the second portion 28 of the exhaust pipe 12 by about 50% or more.

FIG. 10 depicts an alternate mixing system 16'. Mixing system 16' is substantially similar to mixing system 16. As such, similar elements will be identified with like reference numerals including a prime suffix. A detailed description of the substantially similar features will not be provided in this section of the description. It should be appreciated, however, that the previously provided specification applies to mixing system 16', as appropriate.

Mixing system 16' includes a first mixing device 20', a second mixing device 22', and a baffle plate 24'. A transition cone 27' and the remaining elements downstream from this component may be identical to the elements depicted in FIG. 2.

Exhaust pipe 12' differs from exhaust pipe 12 in that exhaust pipe 12' includes an "S-shaped" bend 70 interconnecting a supply portion 72 of the exhaust pipe 12' with a first portion 26' of the exhaust pipe 12'. First mixing device 20' is disposed within first portion 26' and includes a longitudinal centerline 30' extending parallel to longitudinal centerline 32' of second mixing device 22'. Injector 19' is configured to inject a reductant along an injection axis 74. Injection axis 74 may, but need not, extend parallel to longitudinal centerline 30' of first mixing device 20'. The position and orientation of first mixing device 20' addresses the asymmetric flow caused by S-bend 70. The first mixing device 20' functions to redistribute flow into multiple flow paths. In particular, first mixing device 20' separates high and low velocity flows to adjust the maldistribution of flow created by S-bend 70 prior to the exhaust flow engaging second mixing device 22'. The asymmetric exhaust gas flow upstream of first mixing device 20' in combination with a varied distribution of droplet size injected by injector 19' results in larger reductant droplets entering one portion of first mixing device 20' and smaller droplets entering a different portion of first mixing device 20'. The subdivision of flow based on droplet size results in a more efficient decomposition of the reductant within the individual flow paths.

It may be beneficial to rotationally orient the second mixing device 22' relative to the position of an outlet 80 of first mixing device 20'. In particular, it may be desirable to position an upstream portion 82 of helical blade 44 such that upstream portion 82 covers at least 75% of the cross-sectional area of outlet 80 of first mixing device 20'. In one instance, this goal may be accomplished by positioning a leading edge 84 of helical blade 44 at a rotational position similar to the one depicted in FIG. 11. By rotationally positioning leading edge 84 and upstream portion 82 in this manner, sufficient mixing and interaction with second mixing device 22' is assured.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mixing system for an exhaust system, the mixing system comprising:
   a first mixing device including a plurality of first auger blades attached to a central shaft and defining a plurality of flow paths through the first mixing device, a first flow path longitudinal centerline and an inlet having a first cross-sectional area; and
   a second mixing device separate and distinct from the first mixing device and disposed downstream of the first mixing device, the second mixing device including a second flow path longitudinal centerline, an inlet having a second cross-sectional area greater than the first cross-sectional area and a second auger blade, the first flow path longitudinal centerline of the first mixing device extending at an angle to the second flow path longitudinal centerline of the second mixing device, wherein the first flow path longitudinal centerline of the first mixing device intersects the second auger blade, wherein the first mixing device is disposed within a first portion of an exhaust pipe and the second mixing device is disposed in a second portion of the exhaust pipe, the second portion having a larger cross-sectional area than the first portion.

2. The mixing system of claim 1, further comprising a baffle plate separate and distinct from the second mixing device and disposed downstream of the second mixing device.

3. The mixing system of claim 1, wherein each of the first auger blades includes a plurality of apertures.

4. The mixing system of claim 1, wherein each of the first auger blades extends 180 degrees around the central shaft.

5. The mixing system of claim 1, wherein the first auger blades extend in the same rotational direction around the central shaft.

6. The mixing system of claim 1, wherein the second auger blade include a plurality of apertures.

7. The mixing system of claim 1, wherein the second auger blade extends 360 degrees around a second central shaft.

8. The mixing system of claim 1, wherein the second auger blade extends between 180 degrees and 720 degrees around a second central shaft.

9. The mixing system of claim 1, wherein the second mixing device includes only a single auger blade.

10. An exhaust system comprising the mixing system of claim 2, and further comprising:
   a reductant injector disposed upstream of the first mixing device; and
   a catalyst disposed downstream of the baffle plate.

* * * * *